April 7, 1925.                                            1,532,134
F. GELSTHARP
METHOD AND APPARATUS FOR MAKING SHEET GLASS
Filed June 12, 1922            3 Sheets-Sheet 3
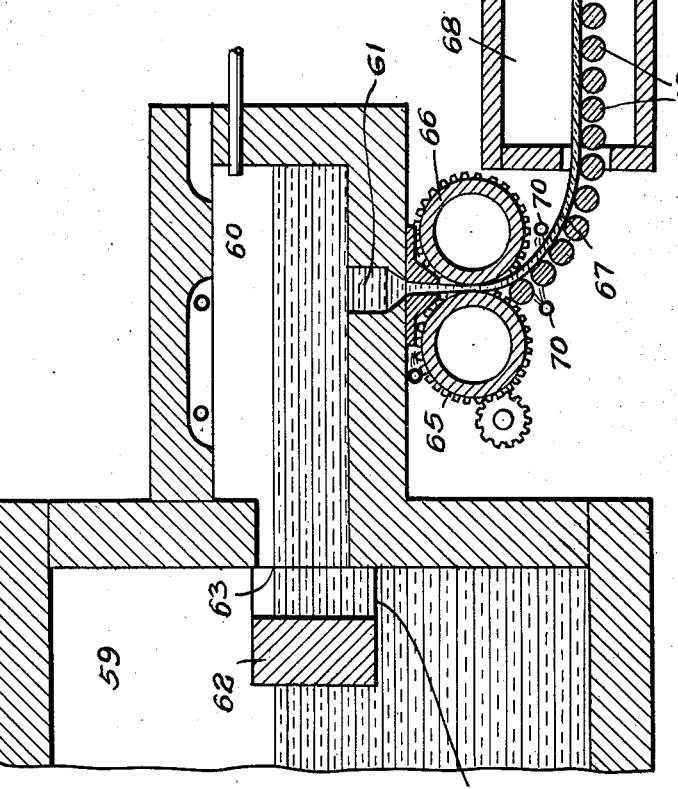
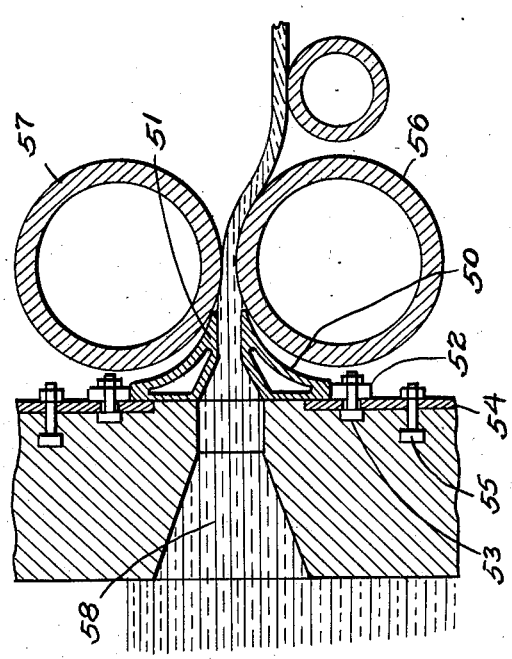
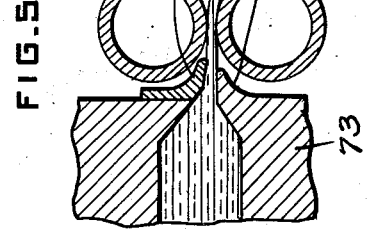
INVENTOR
Frederick Gelstharp
by
James C. Bradley
atty Patented Apr. 7, 1925.

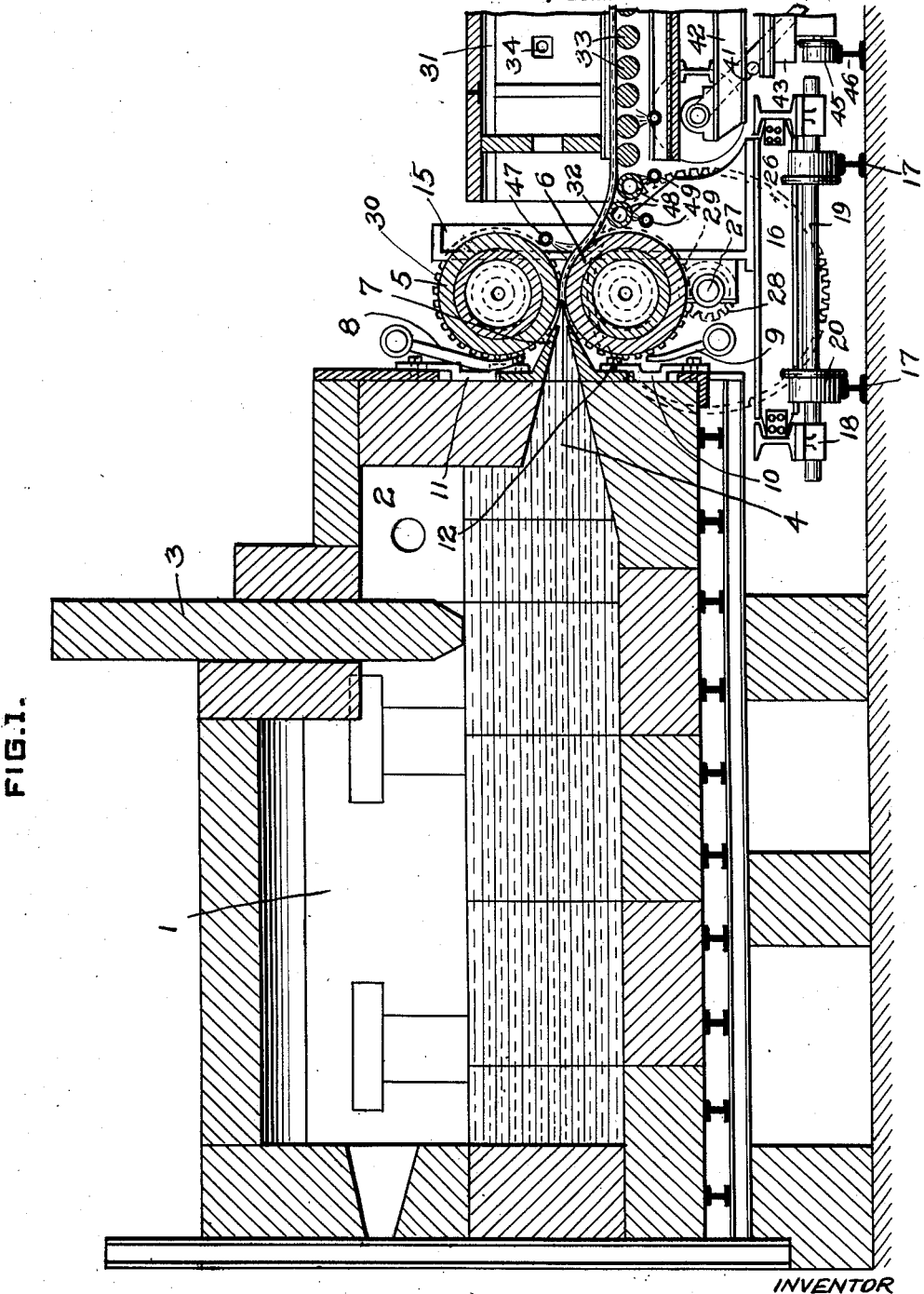

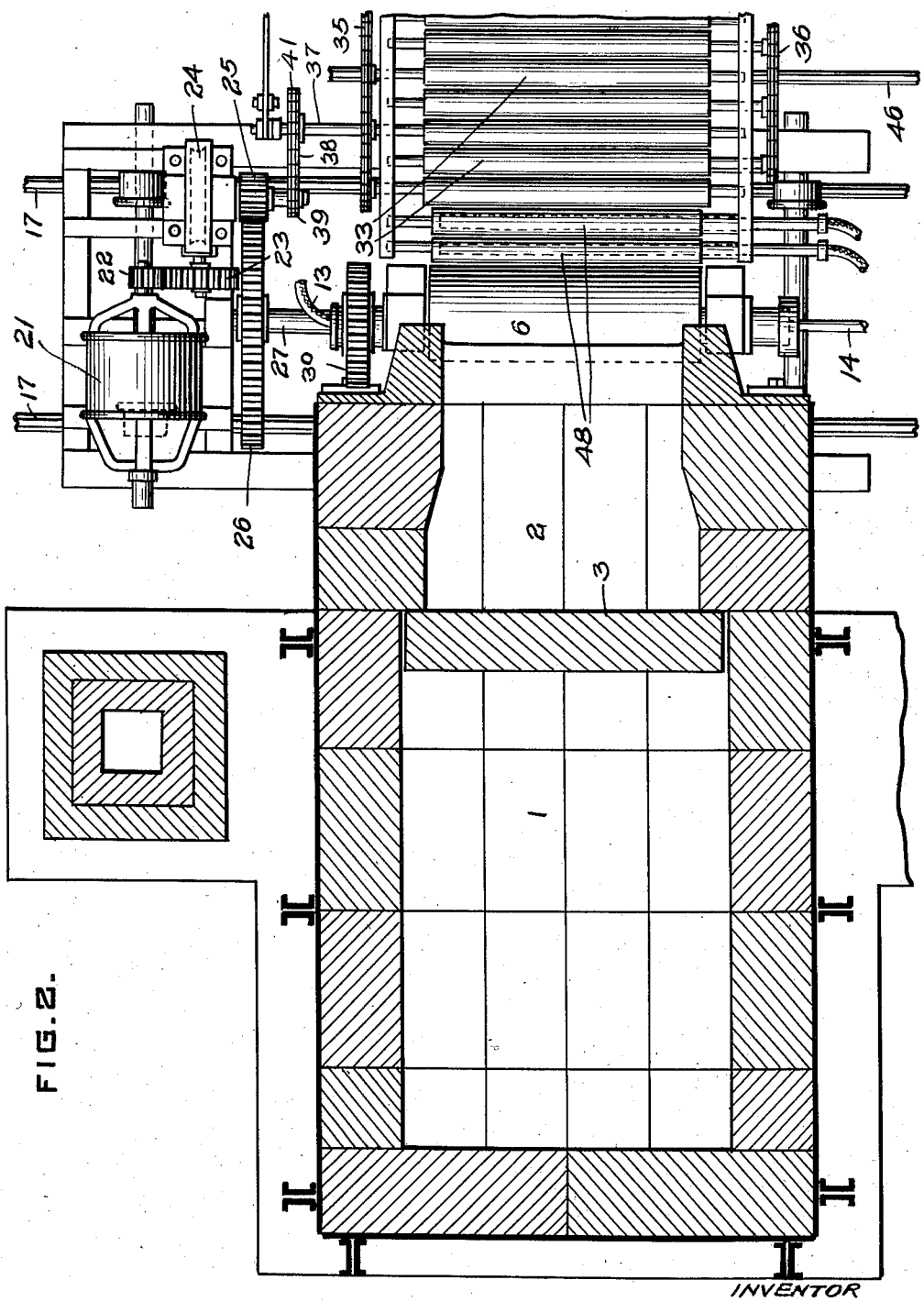

1,532,134

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

METHOD AND APPARATUS FOR MAKING SHEET GLASS.

Application filed June 12, 1922. Serial No. 567,581.

*To all whom it may concern:*

Be it known that I, FREDERICK GELSTHARP, a citizen of Great Britain, and a resident of Tarentum, in the county of Allegheny and State of Pennsylvania, have made a new and useful invention in Improvements in Methods and Apparatus for Making Sheet Glass, of which the following is a specification.

The invention relates to a process and apparatus for making sheet glass, and involves certain improvements over the apparatus and procedure heretofore contemplated in the art, in which the water cooled rolling members employed to form a continuous glass sheet, were placed in the wall of a tank with the molten glass contacting with a very large proportion of the area of the rolls. I have found that in the use of such a construction there was a tendency to produce ream or devitrification, due I believe, to the too great chilling effects of the water cooled rolls on the body of glass in contact with the rolls, and the principal object of the present invention is to avoid this difficulty and still retain the advantages incident to the use of the pair of rolls governing the thickness of the sheet and the rate of flow from the tank. Briefly stated this result is accomplished by the use of a shielding arrangement at the outer end of the passage through which the glass is conducted before it contacts with the rolls. The rolls are placed close to the end of the passage or orifice, so that their rotation governs the rate of flow of the glass and the starting and stopping of such flow as in my prior application, but the walls surrounding the outlet passage at its outer end are arranged to shield the rolls, to a large extent, from contact with the molten glass, the area of contact between the glass and rolls being thus greatly reduced as compared with the area of contact in the form of construction heretofore referred to having the extended area of contact with the water cooled rolls. Certain embodiments of the invention are illustrated in the accompanying drawings wherein:

Figure 1 is a partial vertical section through an apparatus embodying my invention; Fig. 2 is a partial horizontal section and partial plan view of the apparatus of Fig. 1; Fig. 3 is a vertical section illustrating a modified form of orifice construction; Fig. 4 is a vertical section through a modified arrangement of tank and roller construction; and Fig. 5 illustrates in vertical section still another orifice construction. The tank shown comprises a main melting portion 1 and a forehearth 2 with a gate 3, preferably counterweighted and operated by means (not shown) for cutting off communication between the melting tank and the forehearth. A passageway 4 is provided in the wall of the forehearth, and in opposition to this passage is placed a pair of rolls 5 and 6, corresponding in function to similar feed rolls shown in my application heretofore referred to. Intermediate the passage 4 and the rolls 5 and 6 is an orifice or outlet member 7, preferably made of nichrome or some other suitable heat resisting metal, or other sufficiently strong refractory material, which will stand up under the severe conditions encountered as to temperature, and which will not discolor the glass. This member is tapered as shown and extends in between the rolls, so that the area of contact between the glass and rolls is reduced and the glass is supplied relatively near to the vertical center line of the two rolls.

In order to heat the member 7 during the initial portion of the operation and prevent the glass from freezing or solidifying at such time, the burner pipes 8 and 9 are provided to which gas and air are supplied. In a later stage of the operation, it is ordinarily found desirable to reduce the temperature of the orifice member sufficiently to prevent it from overheating, and keep the molten glass from sticking thereto, and at such time cooling flow of air may be applied through the pipes 8 and 9. On the other hand, too great a reduction in temperature causes surface blister and ream. The orifice member is preferably made in two parts held in position by the clamps 10 and 11 which clamps have their inner flanges slotted to receive the stud bolts 12 carried by the orifice sections, so that such sections may be adjusted to increase or decrease the areas of contact of the molten glass and the rolls, depending on the conditions which may be encountered.

The rolls 5 and 6 are made hollow and preferably water cooled by means of water connections 13 and 14 swiveled to the ends of the roll shafts or otherwise suitably connected thereto. These rolls which control the speed of production of the sheet may have an ordinary machine finish, or they may be made smoother by polishing, in which latter case, the sheet produced will have a smoother surface than that produced by the machine finished rolls.

It is regarded as desirable to avoid in so far as is possible, a stretching of the sheet or ribbon, which tends to elongate any bubbles or defects which may be present in the glass, and which show up much more plainly in the finished product, if elongated. The vertical distance between the opposing lips of the slot member is considerably greater than the distance between the two rolls at their nearest point of approach, so that the rolls not only serve to control the feed of the glass, but also roll it out to a thickness which is only a fraction of the thickness of the sheet emerging from the orifice member. The rolls also chill the surface of the ribbon so that it will maintain its shape in passing to the leer, and this action is accentuated by discharging the sheet downwardly over the roll 6 so that its lower side contacts with the surface of the roll for a considerable distance.

In order to provide for the removal of the rolls from the front of the orifice member, when it is necessary to gain access to this portion of the furnace for replacement or repair, the rolls are mounted upon standards 15 carried by the truck 16, which truck is mounted upon the transversely extending rails 17. This truck also carries the drive mechanism for the rolls, so that the complete apparatus may be readily moved out of the way when desired. The truck is provided with bearings 18, in which are mounted the truck axles 19 carrying the wheels 20. As indicated in Fig. 1, the bearings 18 are capable of longitudinal movement upon the shafts 19, so that the truck and rolls carried thereby may be moved away from the front of the furnace a short distance before moving them laterally. This permits of a more ready removal and replacement of truck and the parts carried thereby. Any desired type of driving means for the rolls may be employed, the one shown preferably comprising the electric motor 21 and reducing gearing intermediate the motor and the lower roll 6. The reducing gearing includes the pinion 22 meshing with the spur gear 23 which in turn drives a worm which engages the worm wheel 24. The shaft of the worm wheel carries the pinion 25, which drives the large spur gear 26 on the shaft 27 (Fig. 1), and this shaft 27 carries a small pinion 28 engaging the spur gear 29 on the shaft of the lower roll 6. This spur gear 29 meshes with the gear 30 of equal size upon the shaft of the upper roll 5.

The end only of the leer 31, to which the glass ribbon 32 is conducted, is shown. This leer is of the type employing the driven rollers 33 for carrying the sheet through a sufficient distance to anneal it and permit it to cool to such a point that it will not fracture when exposed to the atmosphere outside the leer. These rollers are placed relatively close together, as indicated, so as to reduce the tendency of the glass while in a relatively plastic condition to become deformed. By this arrangement and by a proper regulation of temperature, as hereinafter described, a sheet is produced having a very flat surface and one which requires much less grinding than the ordinary plate glass as produced by the usual casting method.

The leer is heated by suitable burners, one of which, 34, is shown in Fig. 1. The ends of the rollers 33 are extended through the sides of the leer and alternate rollers on the same side are provided with sprockets which are connected to the endless chains 35 and 36 (Fig. 2) on each side of the machine. These sprocket chains are operated from the countershaft 37, driven from the gearing of the motor 21 by means of the sprocket chain 38, such chain passing over the sprocket 39 on the shaft 40 and over the sprocket 41 on the shaft 37. The leer is preferably supported by a framework 42 (Fig. 1) carried by a substructure 43, and intermediate the framework and the substructure are rollers 44 to permit of the movement of the entire leer endwise to give more clearance between the leer and the furnace, when it is desired to remove the truck and rolls and to other work requiring more room at this point. The section of the leer next the rolls is also provided with wheels 45 mounted on the track 46, so that this part of the leer can be gotten out of the way to give access to the front of the rolls and to the interior of the leer itself.

There is some tendency, particularly when the apparatus is running slowly, for the edges of the sheet to become too greatly cooled and thus cracking and warping of the ribbon occurs. To overcome this difficulty heat may be applied to the upper side of the ribbon by means of the burner pipe 47, which pipe is preferably arranged so that the flame therefrom is directed adjacent to the edges of the sheet, the middle portion of the sheet ordinarily requiring little, if any, additional heat. The ribbon or glass may be supported in its movement from the rolls 5 and 6 by a platen, but is preferably supported by means of the rollers 48, which may be idlers, as shown or may be driven, if desired, and which are preferably hollow and fluid cooled to prevent overheating and the sticking of the glass thereto. The glass ribbon is not cooled to such an extent by these rollers as by the platen, so that the sheet retains its plasticity and flattens more readily as it enters the leer. I have also found it very desirable to increase the heat of the sheet at this point, and to that end have provided a plurality of burner pipes 49 extending longitudinally of the rolls therebeneath with their flames directed upwardly, so that a very considerable degree of heat is applied to the under side of the sheet. The sheet of glass issuing from between the fluid cooled rolls has a chilled skin, and a hotter interior mass, and this condition tends to cause warpage and strain and prevents proper flattening during the annealing. The re-heating of the sheet before annealing to bring it to uniform temperature from surface to surface is, therefore, important in securing a sheet of greatest possible flatness. This re-heating is preferably done before the glass enters the leer, but may be done in the leer itself. The heat is just sufficient to give the uniform heating necessary, such heating ordinarily causing a slight sag between the rollers. The glass thus treated passes over the rollers and in such passage is gradually straightened and when fully set is very flat and of such uniform temperature that it will not warp in its subsequent forward movement.

Fig. 3 illustrates a modification in which the outlet or orifice member consists of the two hollow parts 50 and 51, such members being slotted as indicated at 52 and being secured in any desired position of adjustment by means of the bolts 53. These bolts are secured to plates 54 which are in turn secured to the clay work by means of the bolts 55 having their heads embedded in the clay. In this way the point of delivery of the molten glass to the rolls and the chilling contact between the glass and rolls may be varied to suit conditions. The members 50 and 51 may also be regulated in temperature by passing fluid therethrough. They may be heated or cooled depending upon the requirements as set forth in connection with the construction of Figs. 1 and 2. The remainder of the construction, including the rolls 56 and 57 and the passageway 58 leading into the melting tank, is similar to that of Fig. 1.

Fig. 4 illustrates a modification in which 59 is the melting tank provided with the extension or forehearth 60 and with the outlet passage 61 leading through the lower wall of the forehearth, instead of through the vertical wall as in the other construction. In this construction the flow from the melting tank to the forehearth is stopped by means of the float 62 which also acts as a skimmer for the glass passing from the tank to the forehearth. When it is desired to entirely close the passage 63 between the tank and forehearth, a pair of spacing blocks 64 at the ends of the float are removed and the float brought up against the end of the passageway 63. The rolls 65 and 66 and their driving mechanism correspond throughout with similar parts in the construction of Figs. 1 and 2, and the ribbon 67 is fed into the leer 68, such leer, the rolls 69 and the burners 70 corresponding to similar parts in the other construction.

Fig. 5 illustrates a further modification of the orifice arrangement in which such orifice is formed by the two lips 71 and 72, the lip 71 being of clay and forming part of the wall 73, while the lip 72 is of metal or other suitable refractory material as in the other types of construction, it being desirable in some cases to make both of the lips of clay, as the danger of producing blister and ream is thus reduced. The ribbon 74 is formed in the same manner as the ribbons of the constructions heretofore described and the rolls 75 and 76 and their actuating mechanism are also similar to corresponding parts in the other constructions.

The orifice arrangement of the present application, involving as it does, delivery of the molten glass as near as practical to the pass between the two rolls, so that its contact therewith preliminary to rolling is reduced to a minimum, has less tendency to produce the ream in the glass heretofore referred to and with which difficulty has been experienced in those cases where the rolls are set back into the furnace wall and the body of the molten glass contacts directly with too great an area of such rolls. The space between the lips which are preferably used may be adjusted to suit requirements in regulating the amount of contact with the rolls. The glass is preferably withdrawn through the vertical side wall of the tank, as illustrated in Fig. 1, but the invention is not limited to the withdrawal in this direction and, as indicated in Fig. 4, the ribbon may be withdrawn, if desired, through the horizontal side wall of the forehearth.

What I claim is:

1. The method of forming sheet glass directly from the molten bath in a tank which consists in causing the molten glass to flow from the tank under the head pressure of the bath therein through an outlet passage to a sheet forming pass between rolls arranged to obstruct its free flow, regulating the rate of flow of glass from the tank by the rate of movement of the rolls, maintaining said rolls at a temperature to chill the glass as it passes therethrough, and shielding the rolls from contact with the molten glass until it arrives at a point adjacent the centers of the rolls.

2. The method of forming sheet glass directly from the molten bath in a tank, which consists in causing the molten glass to flow from the tank, under the head pressure of the bath in the tank, through opposed parallel lips, immediately passing the glass between opposed parallel driven rolls, still under the head pressure of the bath, thereby governing the rate of flow from said slot orifice and imparting accurate dimensions to the glass sheet, and varying the distance between the lips of the orifice to regulate the extent of contact of the glass with said rolls.

3. Apparatus for forming sheet glass comprising a receptacle containing a bath of molten glass and having an orifice leading through one of its walls below the surface of the glass with outwardly projecting lips at the end thereof, and a pair of cooled rolling members opposite the orifice and spaced apart a distance corresponding to the thickness of the glass sheet to be produced, at least one of said members being driven and the members being positioned so that the outer end of said orifice lips terminates adjacent the point at which the members most nearly approach each other.

4. Apparatus for forming sheet glass comprising a receptacle containing a bath of molten glass and having an outlet passage through its wall below the surface of the glass, a pair of fluid cooled rolling members spaced apart with the space therebetween adjacent the passage and in opposition thereto, an orifice or outlet member extending outwardly from the wall and between the rolling members, and means for rotating at least one of said members.

5. Apparatus for forming sheet glass comprising a receptacle containing a bath of molten glass and having an outlet passage through its wall below the surface of the glass, a pair of fluid cooled rolling members spaced apart with the space therebetween adjacent the passage and in opposition thereto, a metal lip member at the outer end of the passage projecting between the rolling members, and means for rotating at least one of said members.

6. Apparatus for forming sheet glass comprising a receptacle containing a bath of molten glass and having an outlet passage through its side wall below the surface of the glass, a pair of rolling members spaced apart with the space therebetween adjacent the passage and in opposition thereto, a metal lip member at the outer end of the passage projecting between the rolling members, means for varying the width of the opening through the lip member, and means for adjusting said rolling members toward and from the lip member.

7. Apparatus for forming sheet glass comprising a receptacle containing a bath of molten glass and having an outlet passage through its wall below the surface of the glass, a pair of rolling members spaced apart with the space therebetween adjacent the passage and in opposition thereto, a metal outlet member at the outer end of the passage projecting between the rolling members, and means for varying the width of the outlet through said member.

8. Apparatus for forming sheet glass, comprising a receptacle containing a bath of molten glass and having an outlet passage through its wall below the surface of the glass, a pair of fluid cooled rolling members spaced apart with the space therebetween adjacent the passage and in opposition thereto, a pair of lip members at the outer end of the passage projecting between the rolling members and serving as shields for the rolling members to reduce the area of contact between such rolling members and the glass, and means for rotating at least one of the rolling members to govern the speed of movement of the glass therebetween.

In testimony whereof, I have hereunto subscribed my name this 3rd day of June, 1922.

FREDERICK GELSTHARP.